(12) United States Patent
Rabe et al.

(10) Patent No.: US 6,983,339 B1
(45) Date of Patent: Jan. 3, 2006

(54) METHOD AND APPARATUS FOR PROCESSING INTERRUPTS OF A BUS

(75) Inventors: Jeffrey L. Rabe, Gold River, CA (US); Satish Acharya, El Dorado Hills, CA (US); Zohar Bogin, Folsom, CA (US); Serafin E. Garcia, Folsom, CA (US); David J. Harriman, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 09/675,801

(22) Filed: Sep. 29, 2000

(51) Int. Cl.
*G06F 1/00* (2006.01)

(52) U.S. Cl. .................... 710/260; 710/268; 710/48

(58) Field of Classification Search ........ 710/260–269, 710/305–306, 308–315, 48, 36–38
See application file for complete search history.

(56) References Cited

U.S. PATENT DOCUMENTS

| | | | | |
|---|---|---|---|---|
| 5,375,225 A | * | 12/1994 | Dean et al. ............ | 710/260 |
| 5,956,516 A | * | 9/1999 | Pawlowski ............. | 710/260 |
| 6,006,301 A | * | 12/1999 | Tetrick ................. | 710/306 |
| 6,212,590 B1 | * | 4/2001 | Melo et al. ............ | 710/119 |
| 6,219,741 B1 | * | 4/2001 | Pawlowski et al. ..... | 710/260 |
| 6,247,091 B1 | * | 6/2001 | Lovett ................. | 710/260 |
| 6,295,573 B1 | * | 9/2001 | Bailey et al. .......... | 710/260 |
| 6,301,630 B1 | * | 10/2001 | Chen et al. ........... | 710/306 |
| 6,401,153 B2 | * | 6/2002 | Pawlowski ............ | 710/260 |
| 6,466,998 B1 | * | 10/2002 | Bennett ............... | 710/48 |
| 6,505,263 B1 | * | 1/2003 | Larson et al. ......... | 710/100 |
| 6,629,179 B1 | * | 9/2003 | Bashford .............. | 710/260 |
| 6,694,392 B1 | * | 2/2004 | Haren .................. | 710/65 |

* cited by examiner

*Primary Examiner*—Paul R. Myers
*Assistant Examiner*—Raymond N Phan
(74) *Attorney, Agent, or Firm*—Blakely, Sokoloff, Taylor & Zafman LLP

(57) ABSTRACT

A method and apparatus for delivering APIC interrupts to a processor, and between processors, as FSB transactions. Interrupts and hardware signals, generated by a PCI device, are converted into an upstream memory write interrupt and further converted into an FSB interrupt transaction, received by a processor. Interrupts marked as lowest priority re-directable are redirected based on task priority information. Support for XTPR transactions to update XTPR registers is provided. Preferred ordering of XTPR update transactions and interrupts to be redirected is provided.

18 Claims, 5 Drawing Sheets

METHOD AND APPARATUS FOR PROCESSING INTERRUPTS OF A BUS

FIELD

The present invention relates to front side bus interrupt delivery and redirection, more particularly, conversion of interrupts and hardware signals into front side bus interrupt transactions, redirection of interrupts, support and preferred ordering of XTPR update transactions and interrupts marked re-directable.

BACKGROUND

An input/output (I/O) device within a computer system periodically requests service from a processor. The I/O device generates a signal known as an interrupt request (IRQ) to obtain the processor's service. The type of service required by the I/O device depends on the type of device and its current condition. For example, a keyboard interface circuit generates an interrupt request to inform a processor that a key has been pressed on a computer keyboard. The processor then responds by performing an I/O read bus cycle to get the corresponding keyboard character. Advanced programmable interrupt controllers (APICs) are sometimes used to control the interrupt process. For some time, APICs have been coupled together by way of an APIC bus upon which inter-processor interrupts (IPIs) are generated. The three wire APIC bus has also been used to send interrupts from the APICs to the central processing unit (CPU).

Presently, processors do not support APIC interrupt delivery via a three wire APIC sideband bus. For example, the Willamette and Foster central processing unit (CPU) supports front side bus (FSB) interrupt delivery and not the APIC serial bus interrupt delivery of prior art systems.

BRIEF DESCRIPTION OF THE DRAWINGS

Additional advantages of the invention will become apparent upon reading the following detailed description and upon reference to the drawings, in which.

DETAILED DESCRIPTION

Figure 1:
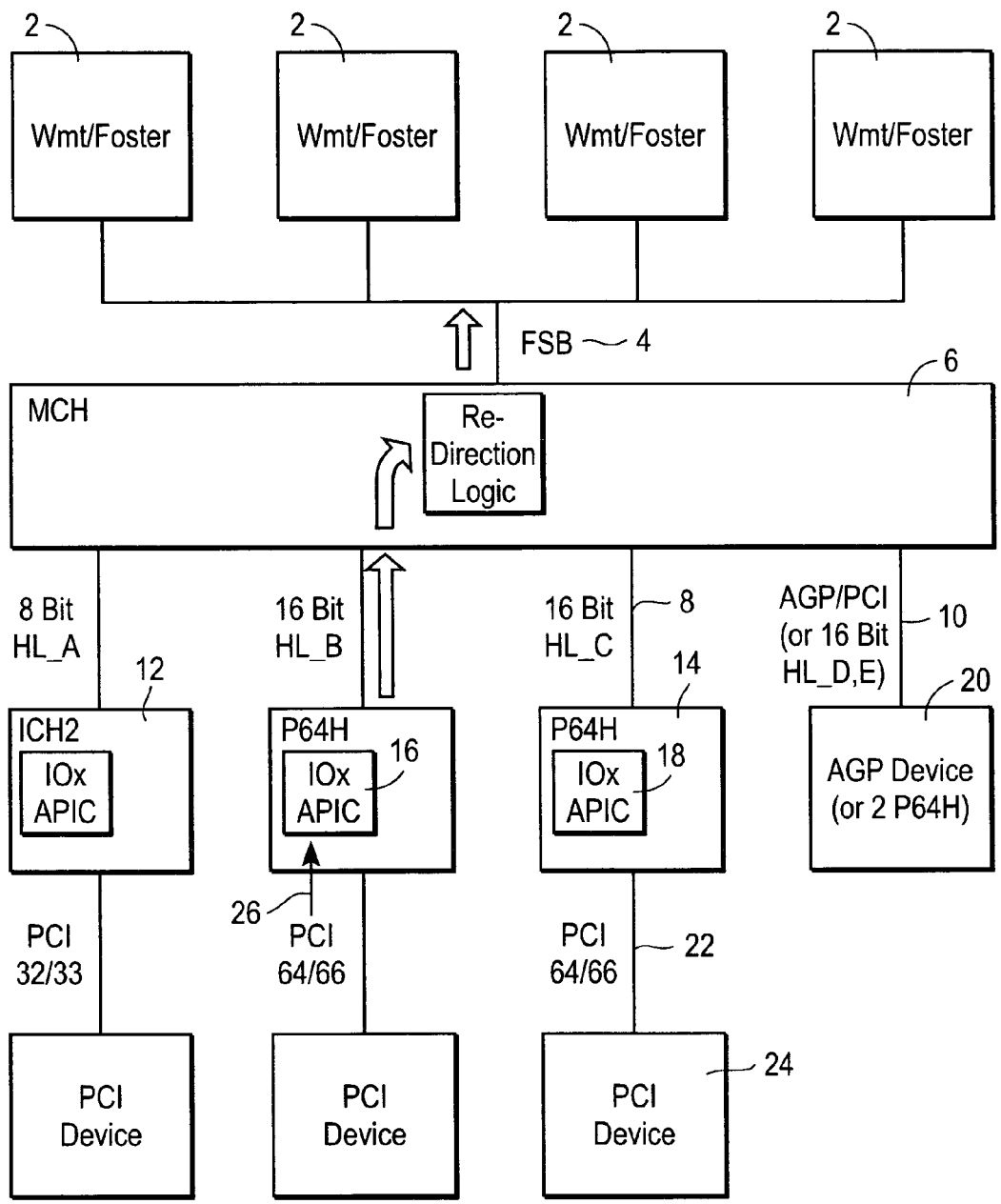
FIG. 1 depicts a hardware IRQ IOxAPIC interrupt flow diagram, in an embodiment of the invention.

Exemplary embodiments are described with reference to specific configurations. Those skilled in the art will appreciate that various changes and modifications can be made while remaining within the scope of the claims.

A need exists to support APIC interrupt delivery. The present invention provides a method and apparatus for delivering APIC interrupts to a processor, or between processors, as FSB transactions.

The invention provides many advantages over known interrupt delivery techniques. One advantage includes ensuring simplified producer and consumer data transfer coherency between interfaces. For example, in the case in which a bus mastering hard disk controller resides on a peripheral component interconnect (PCI) bus and transfers a block of data to a system memory, the hard disk controller writes the last portion of the data block into memory, generates an interrupt via the interrupt controller to the CPU and instructs the CPU that the data in memory is updated and useable. However, there are many layers of temporary storage buffers in the path between the hard disk controller and memory to act as an elastic buffer, absorb the data and write it to memory in the event that the memory is busy. Temporary buffers reside in the I/O controller Hub (ICH) and the Memory Controller Hub (MCH). The indication that data is ready is communicated from the interrupt controller to the CPU on a set of dedicated serial APIC wires. When the CPU receives the interrupt, data may still be in temporary storage buffers. Since the CPU receives an interrupt, it reads and processes old data in memory. To avoid this problem, prior art chipsets block the transmission of the interrupt to the CPU until it is known that data is physically in system memory. However, high bandwidth and highly concurrent chipsets often lead to performance degradations and system hangs due to deadlocks. In one embodiment, the invention overcomes this limitation by teaching FSB interrupt delivery. That is, the hard disk controller transfers data to memory using memory writes and the chipset propagates memory writes to system memory in the order generated. When the hard disk controller issues the subsequent interrupt, since the interrupt is in the form of a Memory Write, the "interrupt" memory write "pushes" the data memory writes ahead to system memory. When the CPU receives the interrupt, the data is in system memory. The MCH must ensure that all data pipes (isochronous, asynchronous, snooped, non-snooped) of a particular Hub interface are flushed upstream prior to propagating the interrupt upstream. Since the address field contains information pertaining to the interrupt instead of a real address, the MCH also must provide a mechanism to steer the interrupt message data to the appropriate field of the FSB interrupt transaction. The MCH also receives the end of interrupt (EOI) transaction from the microprocessor(s) and broadcasts it to all downstream Hub Interfaces that potentially contain IOXAPICs that may be generating level mode interrupts.

A second advantage involves reduction of pin count. Currently the APIC communicates interrupts to the CPU using a dedicated set of three wires, the serial APIC bus. The component containing the APIC and the CPU require a set of these three signals. However, in accordance with the teachings of the present invention, using FSB interrupt delivery, interrupts are delivered over existing address/data paths used for other system data transactions, and three to five signals are saved on both the ICH and the CPU, saving cost.

A third advantage involves a system clock. In prior art systems, the serial APIC bus required its own clocking signal, requiring an output from the system clock driver chip. In accordance with the teachings of the present invention, having FSB interrupt delivery, this clock is no longer needed, saving cost.

In an embodiment, as shown in FIG. 1, APIC interrupt 26 is delivered to processor 2, or between processors, as FSB transaction 4. A chipset, comprising MCH 6 and ICH 12, provides interrupt re-direction for upstream and inter-processor interrupts (IPI), previously provided by a system advanced programmable interrupt controller (APIC). The invention provides a method and apparatus for interrupt re-direction, including support for the task priority register (XTPR) transactions to update XTPR registers in the chipset, and a mechanism to provide preferred (or correct) ordering of XTPR Transaction and interrupts that are to be redirected.

In an embodiment, interrupts marked lowest priority re-directable need to be re-directed to the lowest priority processor. Upstream interrupts and IPIs may both be marked as lowest priority re-directable. MCH 6 redirects these interrupts based on the most current task priority information. Task priority information is periodically downloaded by processors 2 into a task priority registers in MCH 6 using FSB xTPR update transactions. MCH 6 takes precautions ensure a re-directable interrupt occuring about the same time as a XTPR update transaction uses valid information for the re-direction process. For re-directable upstream interrupts occurring simultaneously with an XTPR Update Transaction, MCH 6 ensures that valid task priority information is provided from the TPR registers. For re-directable IPIs, MCH 6 ensures that an interrupt is re-directed using the correct TPR register contents in the event that an IPI is immediately preceded by, or immediately followed by an XTPR update.

In an embodiment, PCI device 24 asserts an interrupt signal to ICH 12 or P64H 14. P64H is an expansion bridge chip that creates multiple PCI bus segments. IOXAPIC 16 in ICH 12 or P64H 14 converts the interrupt into an upstream interrupt message memory write that is sent over a Hub Interface to MCH 6. MCH 6 converts the Hub Interface interrupt message to a FSB Interrupt Transaction that is then interpreted by processor 2.

Alternatively, in another embodiment, a PCI device may generate an interrupt as an message signaled interrupt (MSI). The MSI is in the form of an upstream memory write to a selected address range. The ICH forwards the MSI over a Hub Interface to a MCH. The MCH converts the Hub Interface interrupt message to a FSB interrupt Transaction that is then interpreted by the processor.

As an example, Willamette and Foster CPUs support FSB interrupt delivery and do not support the APIC serial bus interrupt delivery mechanism. In one embodiment, interrupt related messages are encoded on the FSB as "Interrupt Message Transactions". In the Colusa platform FSB interrupts may originate from one of the CPUs on the FSB (IPIs-inter-processor interrupts), or from a downstream device on HI A-E or AGP/PCI. In the later case the MCH drives the "Interrupt Message Transaction" onto the FSB.

In an embodiment, the IOxAPIC environment an interrupt is generated from the IOxAPIC to a CPU in the form of an upstream Memory Write. In the Colusa environment, ICH, P64Hs, and P64H2s contain IOxAPICs, and their interrupts are generated as upstream HI Memory Writes. A PCI device defines MSI's (Message Signaled Interrupts) that are also in the form of Memory Writes. A PCI device may generate an interrupt as an MSI cycle on its PCI bus instead of asserting a hardware signal to the IOxAPIC. The MSI may be directed to the IOxAPIC which in turn generates an interrupt as an upstream HI Memory Write. Alternatively, the MSI may be directed directly to the FSB. The target of an MSI is dependent on the address of the interrupt Memory Write. The Colusa MCH forwards inbound HI and AGP/PCI Memory Writes to the FSB as "Interrupt Message Transactions".

In an embodiment, the Colusa MCH supports re-directing lowest priority delivery mode interrupts to the CPU that is executing the lowest priority task thread. The MCH re-directs interrupts based on the task priority status of each processor thread. The task priority of each processor thread is periodically downloaded to the MCH via the xTPR (Task Priority Register) Special Transaction. The MCH re-directs HI and PCI originated interrupts as well as IPIs. In an embodiment, the Colusa MCH broadcasts EOI cycles generated by a CPU downstream to the HI interfaces. EOIs are not forwarded to AGP/PCI.

In an embodiment, the IOxAPIC is the IO half of the xAPIC architecture. The second half resides in the CPU and is referred to as the local xAPIC. The xAPIC is different from the prior art APIC in that interrupts are communicated from the IOxAPIC to the CPU's local xAPIC in the form of FSB Interrupt Messages instead of using the serial APIC bus. Interrupts are presented to the IOxAPIC itself in one of two ways; as IRQ hardware signals or as Memory Writes (MSIs) to the IOxAPIC IRQ Pin Assertion Register. For either case the IOxAPIC generates an upstream interrupt message that appears as a Memory Write to the MCH. Alternatively, a device may generate a MSI directly to the FSB via the MCH, bypassing the IOXAPIC. In this case, the MSI will be generated upstream as a Memory Write with the same format as an IOxAPIC upstream interrupt message.

In an embodiment, the MCH accepts message based interrupts from AGP/PCI or any of its HI interfaces and forwards them to the FSB as Interrupt Message Transactions. The interrupt messages presented to the MCH are in the form of Memory Writes. At the HI or AGP/PCI interface the Memory Write interrupt message is treated like any other Memory Write; it is either posted into the inbound data buffer, or retried, if data buffer space is not immediately available. Once posted, the Memory Write from AGP/PCI or one of the HI interfaces is decoded as a cycle that needs to be propagated by the MCH to the FSB as an Interrupt Message Transaction.

In alternative embodiments, upstream interrupt messages to the MCH are generated in a variety of ways including hardware IRQ assertion to IOxAPIC, the IOxAPIC generates upstream interrupt messages; MSI from a PCI device directly to the FSB, bypassing IOxAPIC; MSI from a PCI device to upstream IOxAPIC, the IOxAPIC generates upstream interrupt messages; and MSI from PCI device to peer IOxAPIC, the IOxAPIC generates upstream interrupt messages.

An embodiment of hardware IRQ IOxAPIC interrupts are shown in FIG. 1. A device asserts one of the IOxAPIC's IRQ input signals. The IOxAPIC generates an upstream Interrupt Memory Write to the MCH in response to the IRQ assertion. From the MCH's perspective the IOxAPIC's interrupt messages appear as incoming Memory Writes. The MCH supports inbound interrupt Memory Writes from AGP/PCI and from any of its HI A-E interfaces. The MCH decodes Memory Writes as cycles that are to be routed to the FSB as Interrupt Message Transactions. In one embodiment, if the A3 bit of the incoming Memory Write is '0' the MCH forwards the Memory Write to the FSB. If A3 is '1' the MCH will redirect the interrupt by substituting certain bits of the address field prior to forwarding to the FSB.

In an embodiment, a PCI defines Message Signaled Interrupts (MSIs). MSIs allow a device to request interrupt service via a standard Memory Write transaction instead of through a hardware signal. The Memory Write address determines the MSI destination and the data conveys the interrupt characteristics. The information sent in the address and data fields of an MSI are the contents of corresponding interrupt Message Address and Message Data Registers (respectively) in the device. These registers are configured by system software during initialization.

Figure 2:
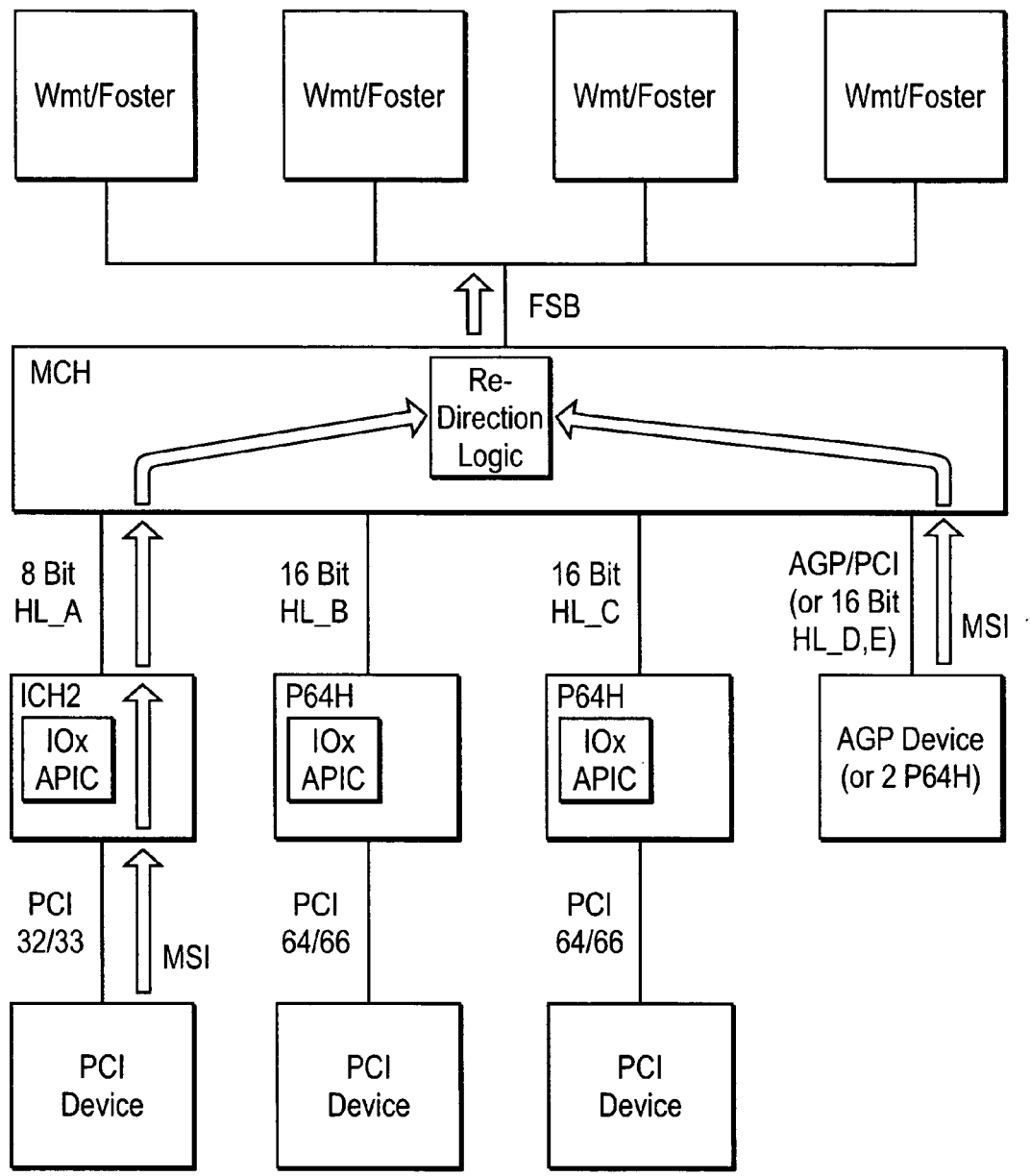
FIG. 2 depicts a MSI to FSB flow diagram, in an embodiment of the invention.

In an embodiment, in a Colusa system, the destination of an MSI will either be the FSB or the Interrupt Assertion Register of one of the IOxAPICs in the system. In an embodiment, a PCI device may be configured to generate a MSI targeting the FSB. This is shown in FIG. 2.

A PCI device can be configured to generate an MSI to the FSB. To the ICH or P64H the incoming MSI appears as a Memory Write and will be routed based on standard address decoding techniques. The ICH or P64H forward the MSI upstream to the MCH via the HI interface, bypassing the IOxAPIC in the ICH or P64H. From the MCH's perspective MSIs bypassing the IOxAPIC appear as incoming Memory Writes.

Figure 3:
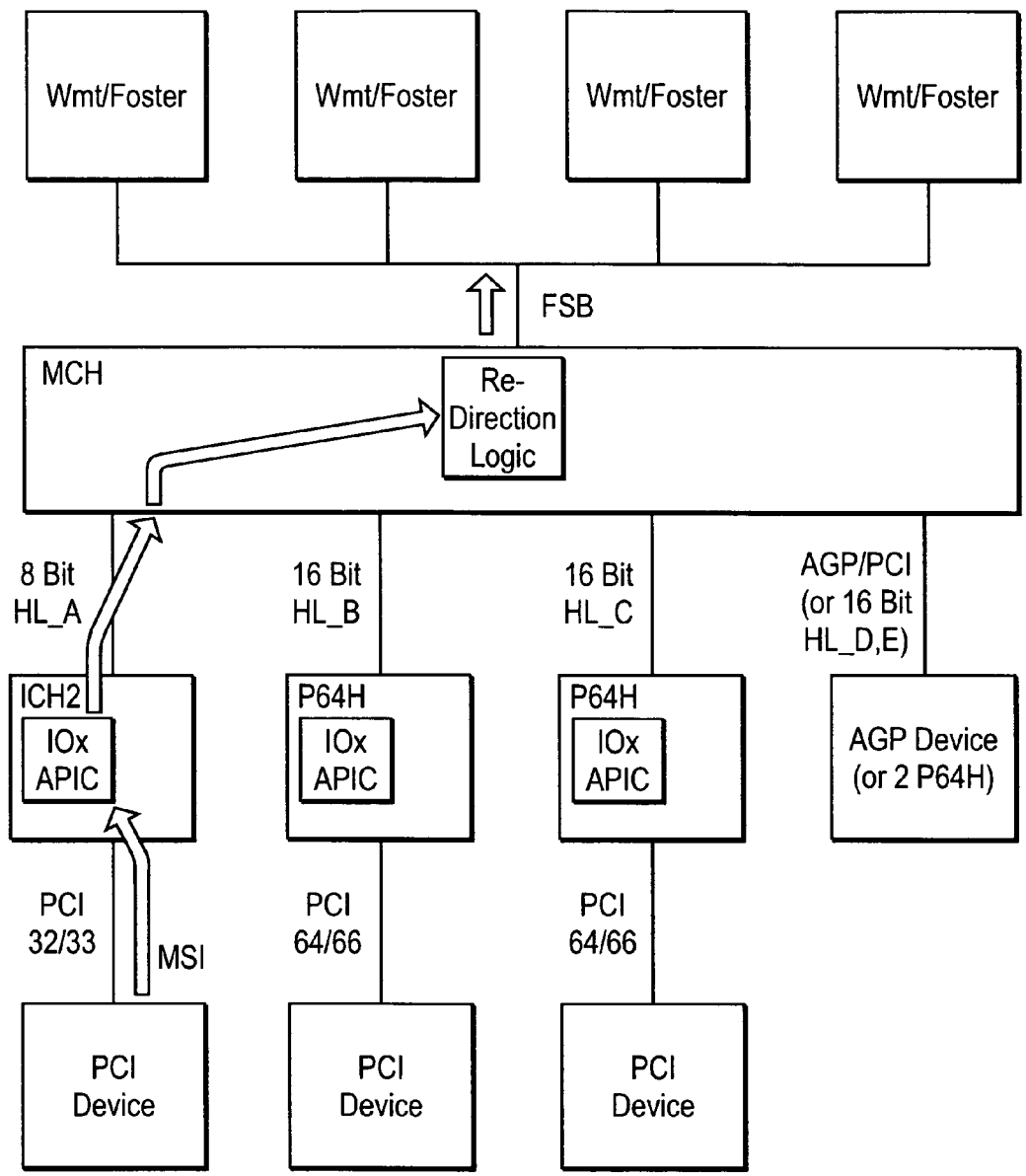
FIG. 3 depicts a MSI to Upstream IOxAPIC flow diagram, in an embodiment of the invention.

In an embodiment, a PCI device may be configured to generate a MSI targeting an upstream IOxAPIC. This is shown in FIG. 3. A PCI device may be configured to generate a MSI targeting an upstream IOxAPIC by setting its MSI Message Address Register to match the address of the upstream IOxAPIC's IRQ Pin Assertion Register. The data field of the MSI contains the interrupt vector and the IOxAPIC responds by generating an upstream interrupt Memory Write just as if the corresponding hardware interrupt input signal on the IOxAPIC was asserted.

Figure 4:
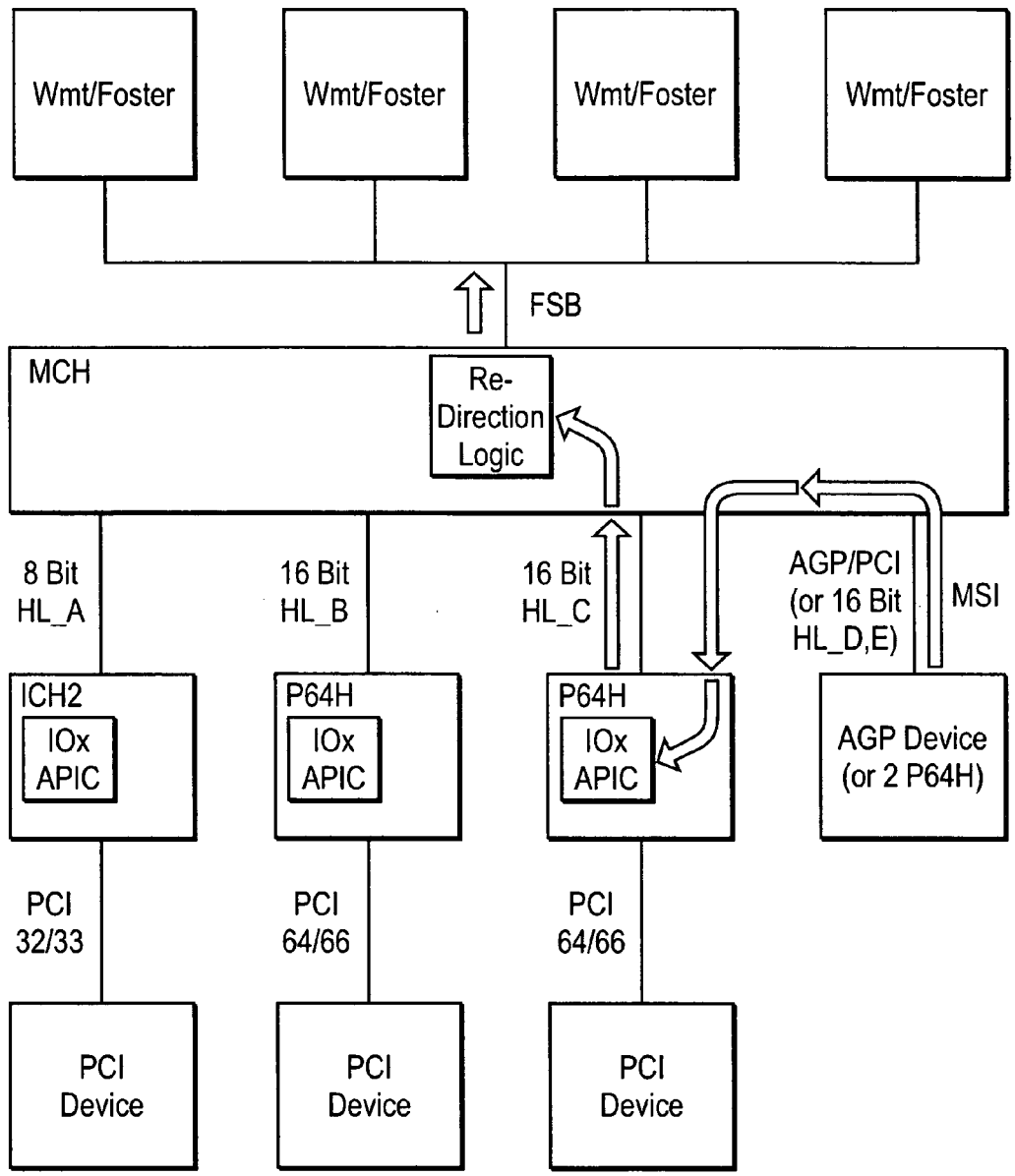
FIG. 4 depicts a MSI to peer IOxAPIC flow diagram, in an embodiment of the invention.

In an embodiment, a PCI device may be configured to generate a MSI targeting a peer IOxAPIC. This is shown in FIG. 4. FSB interrupt delivery is novel to the Willamette/Foster CPU. In P6 systems with serial IOAPICs, MSI is directed to an IOxAPIC's IRQ Pin Assertion Register. In theory a PCI device capable of generating MSIs should direct their MSIs to the FSB. However to support MSIs in a backward compatible fashion during the transition period to FSB interrupt delivery, the MCH supports MSI-to-Peer IOxAPIC interrupt delivery.

A PCI device may be configured to generate a MSI targeting a peer IOxAPIC by setting its MSI Message Address Register to match the address of the peer IOxAPIC's IRQ Pin Assertion Register. The data field of the MSI contains the interrupt vector and the IOxAPIC responds by generating an upstream interrupt Memory Write as if the corresponding hardware interrupt input signal on the IOxAPIC was asserted.

Figure 5:
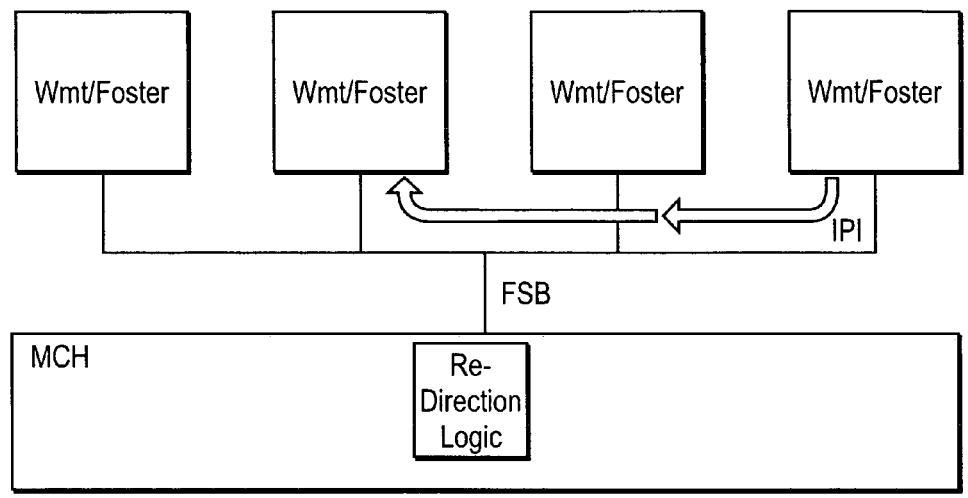
FIG. 5 depicts a flow diagram of IPI without redirection, in an embodiment of the invention.
Figure 6:
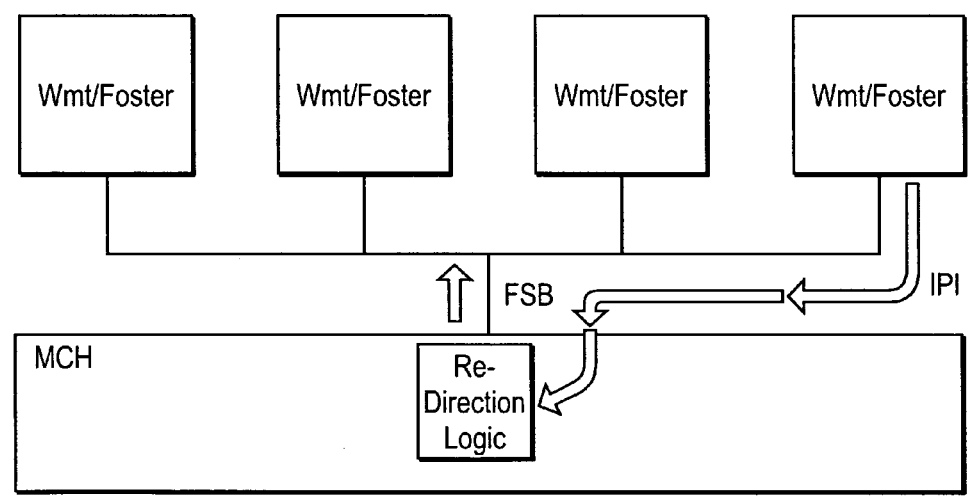
FIG. 6 depicts a flow diagram of IPI with redirection, in an embodiment of the invention.

Any CPU may generate an IPI to any other CPU on the FSB. The IPI generated by a CPU may be directed to a particular CPU(s) or may be redirected to the lowest priority CPU by the MCH. In an embodiment, the IPI is the direct type and will be accepted by the CPU(s) specified by the Destination and Extended Destination fields. This is shown in FIG. 5. In an embodiment, the IPI is the redirected type and will be accepted by the MCH. In response the MCH will turn around and generate a direct type of FSB Interrupt Transaction based on the internal redirection logic in the MCH. This is shown in FIG. 6.

The MCH generates the response phase for both the original CPU driven IPI transaction accepted by the MCH and the subsequent MCH driven interrupt transaction accepted by one of the CPUs. The MCH will drive the "No Data" response if the IPI can be immediately removed from the IOQ. If the MCH can not immediately remove the redirected IPI from the IOQ because it is processing an earlier redirected interrupt, the MCH will Retry the transaction.

In an embodiment, the MCH redirects both upstream interrupt messages and IPIs. The redirection involves substituting particular bit fields with information that was downloaded into the MCH's xTPR registers.

In an embodiment, the xTPR registers may be updated from a CPU. It is possible that a xTPR update may be occurring at exactly the same time that the xTPR register contents are being accessed for redirection purposes. The MCH must internally guarantee that any redirection in progress during a xTPR register update is not corrupted by the update process. From a system timing standpoint, the system assumes that the new xTPR register state will be applied to any redirected interrupt that occurs after the response phase of the corresponding xTPR Special Transaction. This means that the response phase for a xTPR Special Transaction must be delayed until there is no redirection event occurring and that the new xTPR contents are valid immediately following the response phase.

In an embodiment, one of the benefits of signaling interrupts using upstream Memory Writes is that any data written upstream by a device prior to the interrupt is pushed by the interrupt message itself. Because of this attribute, MSI interrupts as defined in a PCI do not require the device driver to read from the interrupting device prior to accessing the data block just written to memory. This means that the MCH must ensure data coherency for MSI interrupts.

In an embodiment, normal upstream write ordering in the MCH will naturally result in prior upstream data writes through a given pipe being visible to the CPU before an interrupt message from the same pipe is delivered to the FSB. Data in all upstream sub-pipes (snooped, non-snooped, isochronous, and asynchronous) for a given MCH interface (HI_B, etc) must be flushed to the point where they are visible to the CPU prior to propagating a subsequent interrupt message from the same interface to the FSB.

In an embodiment, the MCH allows peer-to-peer Memory Write traffic between all I/O interfaces (HIs and AGP/PCI). MSIs generated from one IO interface may be directed to an IOxAPIC on a peer IO interface, which in turn generates an upstream interrupt message to the FSB. For example, a PCI device on HI_B writes a block of data to main memory and then generates an MSI interrupt to an IOxAPIC on HI_C. The IOxAPIC on HI_C generates an interrupt message upstream targeting the FSB. The upstream interrupt message from the IOxAPIC on HI_C pushes writes through the upstream HI_C pipes. However a portion of the data block written by the PCI device on HI_B may still be in the HI_B inbound buffers when the interrupt from the IOxAPIC on HI_C is delivered to the CPU. This would result in a data coherency problem. The MCH must ensure that any upstream write data on a given IO interface is globally visible (to IO and CPU) prior to allowing the MSI from the same interface to be sent to a peer IO interface.

In an embodiment, EOI Message Transactions originate from one of the CPUs. The MCH claims and posts the FSB EOI Message Transaction and broadcasts an EOI or EOI Memory Write downstream on each of the HI A-E. For HI_B-E the FSB EOI is broadcast as HI EOI special cycles. For HI_A (where ICHx is connected) the MCH translates the FSB EOI into a HI Memory Write. This is done to support the ICH which does not support the HI EOI special cycle.

The EOI is sent to all IOxAPIC in the system that support shared interrupts. An EOI does not need to be broadcast to the MCH's AGP/PCI interface. MSI interrupts are by definition non-shared edge triggered interrupts, and edge triggered interrupts do not require an EOI. The MCH may retry the FSB EOI if any one of the multiple HI paths prohibits the immediate removal of the EOI from the IOQ.

Having disclosed exemplary embodiments, modifications and variations may be made to the disclosed embodiments while remaining within the spirit and scope of the invention as defined by the appended claims.

What is claimed is:

1. A method comprising:
receiving at an IO controller hub an interrupt from an IO device;
the IO controller hub converting said interrupt into an upstream memory write interrupt by generating a memory write request to a predetermined address of a memory space, the memory write request being processed via one or more memory cycles by a memory controller hub; and
the memory controller hub converting said upstream memory write interrupt into a front side bus (FSB) interrupt transaction, wherein one or more processors coupled to the FSB are capable of receiving the FSB interrupt as a part of a FSB transaction.

2. The method as in claim 1, wherein said interrupt is generated by a peripheral component interconnect (PCI) device.

3. The method as in claim 2, wherein said FSB interrupt is received by a processor.

4. A method comprising:
receiving at an IO controller hub a message signaled interrupt (MSI) interrupt;
IO controller hub forwarding said MSI interrupt to a memory controller via a memory write request addressed to a predetermined address of a memory space, the memory write request being processed via one or more memory cycles; and
The memory controller converting said MSI interrupt into an FSB interrupt transaction, wherein one or more processors coupled to the FSB are capable of receiving the FSB interrupt as a part of a FSB transaction.

5. The method as in claim 4, wherein said MSI interrupt is generated by a PCI device, and wherein said FSB interrupt is received by a processor.

6. The method as in claim 5, wherein said FSB interrupt is received by a processor.

7. A method comprising:
receiving a hardware signal by an IO controller hub, the hardware signal being generated from a hardware interrupt;
the IO controller hub converting said hardware signal into an upstream memory write interrupt via a memory write request addressed to a predetermined address of a memory space, the memory write request being processed via one or more memory cycles by a memory controller hub; and
the memory controller hub converting said upstream memory write interrupt into an FSB interrupt transaction, wherein one or more processors coupled to the FSB are capable of receiving the FSB interrupt as a part of a FSB transaction.

8. The method as in claim 7, wherein said hardware signal is generated by a PCI device, and wherein said FSB interrupt is received by a processor.

9. The method as in claim 8, wherein said FSB interrupt is received by a processor.

10. An apparatus comprising:
a chipset, an IO controller hub (ICH) configured to receive an interrupt from at least one I/O (input and output) device and to convert said interrupt into an upstream memory write interrupt processed as one or more memory cycles; and
a memory controller hub (MCH) configured to convert said upstream memory write interrupt into an FSB interrupt transaction, which is processed on a FSB (front side bus).

11. The apparatus as in claim 10, said chipset further comprising at least one of an I/O controller hub (ICH), P64H, AGP device.

12. The apparatus as in claim 11, further comprising an I/O component of an advanced programmable interrupt controller (IOxAPIC) configured to convert said interrupt into said upstream memory write interrupt.

13. The apparatus as in claim 12, said chipset further comprising a HUB interface coupled on having a first end coupled to said IOxAPIC and coupled on a second end coupled to a MCH, wherein said memory controller hub (MCH) configured to convert said upstream memory write interrupt into said FSB interrupt transaction.

14. The apparatus as in claim 10, wherein said interrupt is generated by a PCI device, and wherein said chipset is coupled to a processor.

15. The apparatus as in claim 10, wherein said interrupt is a MSI interrupt.

16. The apparatus as in claim 15, said chipset further comprising a HUB interface coupled on having a first end coupled to an ICH and coupled on a second end coupled to a MCH, wherein said ICH configured to forward said MSI interrupt to said HUB interface, and wherein said MCH configured to convert said MSI interrupt into a FSB interrupt transaction.

17. The apparatus as in claim 16, wherein said MCH configured to ensure at least one data pipe of a HUB interface is flushed upstream before propagating an interrupt upstream.

18. The apparatus as in claim 16, wherein said MCH configured to receive an end of interrupt (EOI) from a processor and broadcast said EOI to at least one downstream HUB interface IOxAPIC generating at least one level mode interrupt.

* * * * *

UNITED STATES PATENT AND TRADEMARK OFFICE
CERTIFICATE OF CORRECTION

PATENT NO. : 6,983,339 B1 Page 1 of 1
APPLICATION NO. : 09/675801
DATED : January 3, 2006
INVENTOR(S) : Rabe et al.

It is certified that error appears in the above-identified patent and that said Letters Patent is hereby corrected as shown below:

In column 4, at line 19, delete "IOXAPIC" and insert --IOxAPIC--.

Signed and Sealed this

Sixth Day of November, 2007

JON W. DUDAS
*Director of the United States Patent and Trademark Office*